United States Patent
Maria et al.

(10) Patent No.: US 6,936,301 B2
(45) Date of Patent: Aug. 30, 2005

(54) METHODS OF CONTROLLING OXYGEN PARTIAL PRESSURE DURING ANNEALING OF A PEROVSKITE DIELECTRIC LAYER

(75) Inventors: Jon-Paul Maria, Raleigh, NC (US); Angus Ian Kingon, Cary, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/139,454

(22) Filed: May 6, 2002

(65) Prior Publication Data

US 2003/0207150 A1 Nov. 6, 2003

(51) Int. Cl.[7] ............................. B05D 5/12; B05D 3/02
(52) U.S. Cl. .................. 427/79; 427/126.3; 427/376.2; 427/377; 427/372.2; 427/81
(58) Field of Search ............................. 427/79, 80, 81, 427/126.3, 376.2, 377

(56) References Cited

U.S. PATENT DOCUMENTS

| | | | |
|---|---|---|---|
| 4,241,378 A | * 12/1980 | Dorrian | 361/305 |
| 6,541,137 B1 | 4/2003 | Kingon et al. | 427/701 |
| 2002/0079622 A1 | * 6/2002 | Randall et al. | 264/618 |
| 2002/0098333 A1 | * 7/2002 | Feltz et al. | 428/210 |

FOREIGN PATENT DOCUMENTS

EP 0 609 081 A2 8/1994

OTHER PUBLICATIONS

International Search Report, PCT/US03/09595, Dec. 17, 2003.

Nakamura et al., *Iron mixed–valence compounds, $BaSm(Cu_{0.5+x}Fe_{0.5-x})_2O_{5+\delta}$ I: Synthesis and chemical characterization*, Physica C, V. 338, 2000, pp. 121–125.

Song et al., *Pressure Effect on the Formation of Ferroelectric $SrBi_2Ta_2O_9$ Thin Films*, Jpn. J. Appl. Phys., vol. 39, 2000, pp. 2791–2792.

Bursill et al, *Crystallization of sol–gel derived lead–zirconate–titanate thin films in argon and oxygen atmospheres*, Journal of Applied Physics, vol. 75, No. 9, 1994, pp. 4501–4509.

* cited by examiner

*Primary Examiner*—Brian K. Talbot
(74) *Attorney, Agent, or Firm*—Myers Bigel Sibley & Sajovec (57) ABSTRACT

Oxygen partial pressure may be controlled during annealing of a perovskite dielectric layer by providing an oxygen-absorbing layer adjacent the perovskite dielectric layer, and annealing the perovskite dielectric layer in an ambient that includes an ambient oxygen partial pressure, such that the oxygen-absorbing layer locally reduces the oxygen partial pressure adjacent the perovskite dielectric layer to below the ambient oxygen partial pressure. Thus, a perovskite dielectric layer can be annealed without the need to provide ultra-high vacuum and/or ultra-high purity ambient environments.

30 Claims, 2 Drawing Sheets

METHODS OF CONTROLLING OXYGEN PARTIAL PRESSURE DURING ANNEALING OF A PEROVSKITE DIELECTRIC LAYER

FIELD OF THE INVENTION

This invention relates to perovskite dielectric layers and fabrication methods therefor, and more particularly to methods and structures for annealing perovskite dielectric layers.

BACKGROUND OF THE INVENTION

Capacitors are widely used in consumer and commercial applications. As is well known to those having skill in the art, a capacitor generally includes spaced apart electrodes with a dielectric layer therebetween.

As the integration density of electronic devices continues to increase, it may become desirable to provide capacitors that have increasingly larger capacitance-per-unit-area of an integrated circuit substrate in which the capacitor is used and/or of a printed circuit board or other higher level package in which the capacitor is used. One way to increase the capacitance-per-unit-area is to increase the dielectric constant of the dielectric material.

In order to increase the dielectric constant of the dielectric material, perovskite dielectrics have been widely investigated and used. As is well known to those having skill in the art, perovskite dielectrics comprise a class of high permittivity ceramic dielectrics having a perovskite crystal structure and include dielectric oxides, such as lead zirconate titanate (PZT) and lead lanthanum zirconate titanate (PLZT). These dielectrics may be formed into very thin flexible robust layers with very high dielectric constants. As used herein, the term "perovskite dielectric layer" means a layer that includes one or more perovskite dielectrics, and may also include additional non-perovskite dielectric materials.

As is well known to those having skill in the art, a perovskite dielectric layer may be annealed at a high temperature, generally higher than about 500° C. and often at about 750° C. However, if an excessive oxygen partial pressure, such as an oxygen partial pressure that is greater than about $10^{-10}$ Torr, is present during the anneal, the beneficial effects of the anneal may be reduced and/or the anneal may cause other deleterious effects on the perovskite dielectric layer and/or other layers of the capacitor, integrated circuit or higher level package. Perovskite dielectric layers also may be used in many other applications, such as a gate insulating layer of a field effect transistor or an interlayer dielectric layer of an integrated circuit. The above-described deleterious effects also may take place during annealing in these other applications.

In view of the above, it is known to provide low oxygen partial pressures during annealing of a perovskite dielectric layer by vacuum annealing in an ultra-low pressure (ultra-high vacuum) environment, to obtain an oxygen partial pressure in the range of, for example, $10^{-10}$ Torr. Unfortunately, this high vacuum annealing may be difficult and/or expensive to maintain. It is also known to provide atmospheric or sub-atmospheric pressure annealing in an ultra-pure gas mixture having an extremely low oxygen partial pressure in the range of, for example, $10^{-10}$ Torr. For example, ultra-high purity gas mixtures between CO and $CO_2$ and/or between $H_2$ and $H_2O$ may provide sufficiently low oxygen partial pressure. Unfortunately, significant effort and/or expense may be needed to supply and maintain these ultra-high purity gases.

SUMMARY OF THE INVENTION

Some embodiments of the present invention control oxygen partial pressure during annealing of a perovskite dielectric layer by providing an oxygen-absorbing layer adjacent the perovskite dielectric layer, and annealing the perovskite dielectric layer in an ambient that includes an ambient oxygen partial pressure, such that the oxygen-absorbing layer locally reduces the oxygen partial pressure adjacent the perovskite dielectric layer to below the ambient oxygen partial pressure. According to some embodiments of the present invention, a perovskite dielectric layer can be annealed without the need to provide ultra-high vacuum and/or ultra-high purity ambient environments.

In other embodiments of the present invention, an acceptor-doped perovskite dielectric layer is formed on a conductive layer that comprises a base metal, such as nickel or copper. The acceptor-doped perovskite layer is annealed in an ambient that includes an ambient oxygen partial pressure, such that the conductive layer that comprises a base metal absorbs oxygen adjacent the acceptor-doped perovskite dielectric layer, to locally reduce the oxygen partial pressure in the acceptor-doped perovskite dielectric layer below the ambient oxygen partial pressure.

Some embodiments of the present invention can provide a perovskite dielectric layer and a conductive layer that may be used as an insulated electrode layer and/or as an electrode and dielectric layer of a capacitor. These structures may be used in an integrated circuit, and/or in a higher level package such as a printed circuit board.

In some embodiments of the present invention, the annealing can take place in an ambient that includes an ambient oxygen partial pressure of at least $10^{-5}$ Torr at temperature of at least about 500° C. In other embodiments of the present invention, the annealing can take place in an ambient that includes an ambient oxygen partial pressure of at least $10^{-3}$ Torr at temperature of at least 500° C. In yet other embodiments of the present invention, the annealing takes place in an ambient that includes an ambient oxygen partial pressure of between $10^{-3}$ Torr and about $10^{-2}$ Torr at temperature of at least about 500° C. In other embodiments of the present invention, the annealing takes place in an ambient that includes an ambient oxygen partial pressure of between about $10^{-3}$ Torr and about $10^{-2}$ Torr at temperature of about 750° C. In still other embodiments of the present invention, the annealing takes place in a nitrogen ambient that contains about five parts per million of oxygen. In yet other embodiments of the present invention, the annealing takes place at atmospheric pressure in a nitrogen ambient that is obtained from a bottled nitrogen gas cylinder and/or by boiling off liquid nitrogen. In still other embodiments of the present invention, the annealing takes place such that the ambient oxygen partial pressure does not form an oxide of the oxygen-absorbing layer between the oxygen absorbing layer and the perovskite dielectric layer. In yet other embodiments of the present invention, the annealing takes place such that the ambient oxygen partial pressure does not oxidize the oxygen-absorbing layer adjacent the perovskite dielectric layer.

According to other embodiments of the present invention, an electronic structure is fabricated by providing a metal foil comprising first and second cladding layers comprising a base metal, and a core layer comprising a base metal therebetween. A perovskite dielectric layer is formed on the first cladding layer. The perovskite dielectric layer is annealed in an ambient that includes an ambient oxygen partial pressure of at least $10^{-5}$ Torr at temperature of at least about 500° C. In other embodiments of the present invention, annealing may take place in one the ambients described above. Moreover, in some embodiments of the present invention, the core layer may comprise copper and the first and second cladding layers may comprise nickel. In other embodiments of the present invention, the core layer is substantially thicker than the first and second cladding layers. In still other embodiments of the present invention, the core layer is substantially thicker than the perovskite dielectric layer. In yet other embodiments of the present invention, the layer comprising perovskite dielectric layer is directly on the first cladding layer. In still other embodiments, only a first cladding layer is provided.

In all of the embodiments of the present invention that were described above, an electrode layer may be fabricated on the perovskite dielectric layer, to produce a capacitor. In still other embodiments of the present invention, additional conductive and/or insulating layers may be formed.

Electronic structures according to embodiments of the present invention include a perovskite dielectric layer and an oxygen-containing layer having a first face adjacent the perovskite dielectric layer, a second face opposite the perovskite dielectric layer and a center region therebetween. The oxygen-containing layer has lower oxygen concentration at the center region than adjacent at least one of the first and second faces thereof. In some embodiments of the present invention, the oxygen-containing layer has lower oxygen concentration at the center region than adjacent both of the first and second faces thereof. In other embodiments of the present invention, the oxygen concentration in the oxygen-containing layer decreases from adjacent the second face to adjacent the first face. In still other embodiments of the present invention, the oxygen concentration in the oxygen-containing layer decreases from adjacent the second face to the center region and from adjacent the first face to the center region. In some embodiments, these decreases may follow a functional form that is consistent with a diffusion controlled process, such as, but not limited to, exponential decay.

In other embodiments of the invention, the oxygen-containing layer comprises a first cladding layer comprising nickel on the perovskite dielectric layer, a core layer comprising copper on the first cladding layer opposite the perovskite dielectric layer, and a second cladding layer comprising nickel on the core layer opposite the first cladding layer. In other embodiments, only a first cladding layer is provided. In some embodiments of the present invention, the core layer includes an average oxygen concentration that is less than that of the second cladding layer, and the first cladding layer includes an average oxygen concentration that is less than that of the core layer. In other embodiments of the present invention, the oxygen concentration decreases across the core layer from the second cladding layer to the first cladding layer. In still other embodiments of the present invention, the core layer includes an average oxygen concentration that is less than that of the first and second cladding layers. In yet other embodiments of the present invention, the core layer includes a center region, and the oxygen concentration decreases across the core layer from adjacent the cladding layer to the center region, and from adjacent the first cladding layer to the center region. In some embodiments, these decreases may follow a functional form that is consistent with a diffusion controlled process, such as, but not limited to, exponential decay. In still other embodiments of the present invention, a layer comprising metal also is provided on the perovskite dielectric layer, to produce a capacitor.

DETAILED DESCRIPTION OF PREFERRED EMBODIMENTS

The present invention now will be described more fully hereinafter with reference to the accompanying figures, in which embodiments of the present invention are shown. This invention may, however, be embodied in many alternate forms and should not be construed as limited to the embodiments of the present invention set forth herein.

Accordingly, while the invention is susceptible to various modifications and alternative forms, specific embodiments of the present invention are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures. In the figures, the dimensions of layers and regions may be exaggerated for clarity. It will also be understood that when an element, such as a layer, region or substrate, is referred to as being "on" another element, it can be directly on the other element or intervening elements may also be present. In contrast, when an element, such as a layer, region or substrate, is referred to as being "directly on" another element, there are no intervening elements present.

FIGS. 1–4 are schematic cross-sectional views of electronic structures according to various embodiments of the present invention during annealing according to various embodiments of the present invention. More specifically, referring to FIG. 1, an annealing chamber 120 is used to anneal a perovskite dielectric layer 100. The annealing chamber 120 may be a standard annealing furnace that is widely used in electronic device fabrication, and need not be described further herein. In some embodiments of the present invention, annealing temperatures of at least about 500° C. may be used. In other embodiments of the present invention, annealing temperatures of about 750° C. and annealing times of about 30 minutes may be used.

Figure 1:
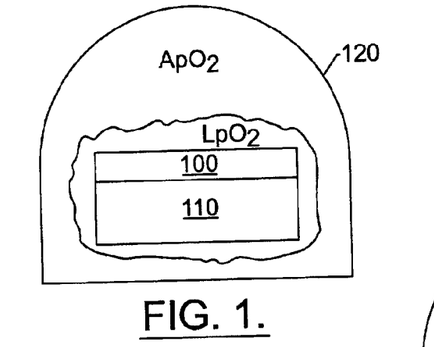
FIGS. 1–4 are schematic cross-sectional views of electronic structures according to various embodiments of the present invention during annealing according to various embodiments of the present invention.

In some embodiments of the present invention, the perovskite dielectric layer 100 comprises lead zirconate titanate (PZT), lead lanthanum zirconate titanate (PLZT), lead lanthanide titanate (PLT), lead titanate (PT), lead zirconate (PZ), lead magnesium niobate (PMN), barium titanate (BTO), strontium titanite (STO) and/or barium strontium titanate (BSTO). In other embodiments of the present invention, the perovskite dielectric layer 100 comprises PLZT with the formula $(Pb_{1-x}La_x)(Zr_{0.52}Ti_{0.48})O_3$, where x is about 0.15. Moreover, in other embodiments of the invention, small quantities of acceptors, such as Ni, Nb, Ca and Sr may be used. In still other embodiments of the present invention, Ca-doped PZT with the general formula $Pb_{1-x}Ca_{x+y}(Zr_ATi_B)_{1-y}O_3$ where $(x+y)\leq15$ and $(a+b)=1$ may be used. These perovskite dielectric layers 100 may be fabricated by chemical solution deposition (CSD), evaporation, sputtering, physical vapor deposition, chemical vapor deposition and/or other techniques. In some embodiments of the present invention, CSD may be used to form very thin, flexible, robust layers with very high dielectric constants. In some embodiments of the present invention, the thickness of the perovskite dielectric layer 100 is about 1 μm. However, thicker or thinner layers may be used in other embodiments of the present invention.

Still referring to FIG. 1, according to some embodiments of the present invention, an oxygen-absorbing layer 110 is provided adjacent the perovskite dielectric layer 100. In some embodiments of the present invention, the oxygen-absorbing layer 110 comprises one or more base metals, such as copper, nickel and/or alloys thereof. In other embodiments of the present invention, the oxygen-absorbing layer 110 includes a plurality of layers, as will be described below. In some embodiments of the present invention, the oxygen-absorbing layer 110 is capable of oxidizing passively while remaining conductive. In other words, the oxygen-absorbing layer 110 can oxidize incompletely, allowing additional oxygen to pass through the oxidized surface of the oxygen-absorbing layer 110. Moreover, in other embodiments of the present invention, the oxidized surface of the oxygen-absorbing layer 110, if any, remains sufficiently conductive and thin, so as not to form an oxide of the oxygen-absorbing layer 110 between the oxygen-absorbing layer 110 and the perovskite dielectric layer 100.

As shown in FIG. 1, according to some embodiments of the present invention, the perovskite dielectric layer 100 is annealed in an ambient in the annealing chamber 120 that includes an ambient oxygen partial pressure $ApO_2$, such that the oxygen-absorbing layer 110 locally reduces the oxygen partial pressure adjacent the perovskite dielectric layer 100, to provide a local oxygen partial pressure $LpO_2$ that is below the ambient oxygen partial pressure $ApO_2$. Stated differently $LpO_2<ApO_2$. Moreover, in some embodiments of the present invention, $LpO_2<<ApO_2$. In other embodiments of the present invention, $LpO_2$ is about five orders of magnitude less than $ApO_2$. In yet other embodiments of the present invention, $ApO_2$ may be at least about $10^{-3}$ Torr, whereas $LpO_2$ can be as little as $10^{-10}$ Torr. In other embodiments of the present invention, $ApO_2$ is between about $10^{-3}$ Torr and about $10^{-2}$ Torr. In still other embodiments of the present invention, $ApO_2$ is at least about $10^{-5}$ Torr.

Without wishing to be bound by any theory of operation, oxygen-absorbing layers according to some embodiments of the present invention can provide low local oxygen partial pressures that may be desirable in annealing perovskite dielectric layers, without the need for vacuum annealing to provide ambient oxygen partial pressures in the range of $10^{-10}$ Torr, and without the need for atmospheric annealing in ultra-pure gas mixtures having an effectively low oxygen pressure, such as in the range of $10^{-10}$ Torr. By providing the oxygen-absorbing layer 110 adjacent the perovskite dielectric layer 100, the interaction of the oxygen-absorbing layer 110 with a medium oxygen partial pressure in the annealing chamber's ambient atmosphere can set the local oxygen partial pressure in the oxygen-absorbing layer's immediate vicinity through slow oxygen gettering. Thus, the perovskite dielectric layer 100 can reside in an ambient with reduced local oxygen partial pressure $LpO_2$.

It will be understood that in FIGS. 1–4, the illustration of the $LpO_2$ region surrounding the perovskite dielectric layer 100 and the oxygen-absorbing layer 110 is conceptual, and may vary in extent from that shown. Moreover, the demarcation between the $ApO_2$ region and the $LpO_2$ region may be gradual, rather than abrupt as shown.

In some embodiments of the present invention, the oxygen-absorbing layer 110 may be on a substrate, such as an integrated circuit chip or a higher level package such as a printed circuit board. In other embodiments of the present invention, freestanding structures comprising an oxygen-absorbing layer 110 and a perovskite dielectric layer 100 may be annealed. Yet other combinations of layers may be annealed in other embodiments of the present invention. Moreover, after annealing, the annealed perovskite dielectric layer may be placed in or on a substrate, such as an integrated circuit chip or a printed circuit board for incorporation therein.

Figure 2:
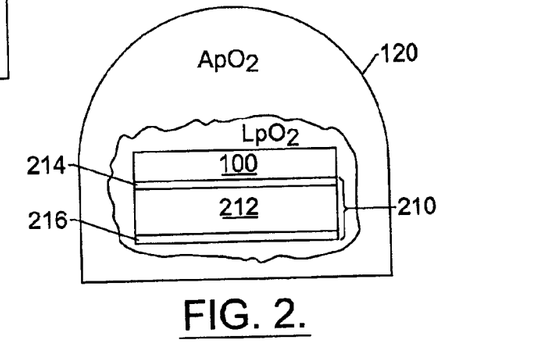

FIG. 2 illustrates other embodiments of the present invention, wherein the oxygen-absorbing layer includes a plurality of layers. More specifically, in FIG. 2, the oxygen-absorbing layer 210 includes a core layer 212 comprising a base metal and first and second cladding layers 214 and 216 comprising a base metal. In some embodiments of the present invention, the core layer comprises copper and the first and second cladding layers 214 and 216, respectively, comprise nickel, such as electroless nickel. In other embodiments of the present invention, the core layer 212 may comprise one or more metals selected from copper, copper alloy, nickel and nickel alloy. In still other embodiments, only a first cladding layer 214 may be provided.

In some embodiments of the present invention, the core layer 212 is substantially thicker than the first and second cladding layers 214 and 216. In other embodiments of the present invention, the core layer 212 is substantially thicker than the perovskite dielectric layer 100. In still other embodiments of the present invention, the first and second cladding layers 214 and 216 are about 4 μm thick, and the core layer 212 is about 17 μm thick. In other embodiments of the present invention, the perovskite dielectric layer 100 is about 1 μm thick. In still other embodiments of the present invention, the perovskite dielectric layer 100 is directly on the first cladding layer 214.

In still other embodiments of the present invention, the core layer 212 is a conductive metal foil, such as a copper foil. In some embodiments of the present invention, the first and second cladding layers 214 and 216 may be deposited on the conductive metal foil by sputtering, electroless plating or electrolytic plating metals selected from palladium, platinum, iridium, nickel phosphorus, nickel chromium and/or nickel chromium with a minor amount of aluminum. In yet other embodiments of the present invention, the cladding layers comprise electroless or electrolytic nickel phosphorus. The phosphorus content of the nickel phosphorus may generally range from about 1 to about 40 weight-percent phosphorus. In other embodiments of the present invention, about 4–11 weight-percent phosphorus may be used. In still other embodiments of the present invention, about 7–9 weight-percent phosphorus may be used.

In other embodiments of the present invention, the oxygen-absorbing layer 210 comprises a copper core 212 and first and second cladding layers 214 and 216, respectively, that comprise a nickel alloy having a concentration of alloy ingredient that is effective to limit oxidization of the cladding layers 214 and 216. In some embodiments of the present invention, concentrations between about 2% and about 9% may be used. In some embodiments of the present invention, the cladding layers may be between about 1 µm and about 5 µm in thickness. In some embodiments of the present invention, the core 212 may be between about 20 µm and about 50 µm thick.

In some embodiments of the present invention, the perovskite dielectric layer 100 may be between 0.1 µm and about 1 µm in thickness. In other embodiments of the present invention, it may be between about 2 µm and about 4 µm of calcium-doped PLZT or PZT. It also will be understood that the first and second cladding layers 214 and 216, respectively, need not be identical.

Various multilayer conductive foils that may be used for oxygen-absorbing layers according to embodiments of the present invention are described in application Ser. No. 09/629,504, filed Jul. 31, 2000, entitled Multi-Layer Conductor-Dielectric Oxide Structure to the present inventors, the disclosure of which is hereby incorporated herein by reference in its entirety as if set forth fully herein.

Figure 3:
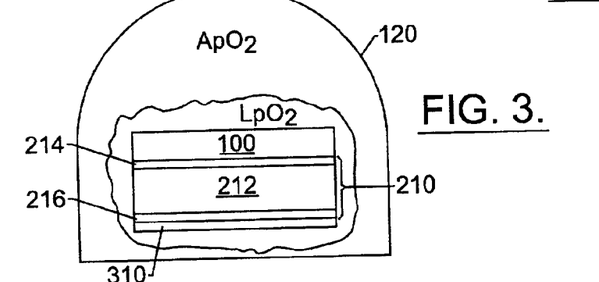

FIG. 3 illustrates other embodiments of the present invention wherein an oxide 310 of the second cladding layer 216 is formed on the second cladding layer 216 opposite the core layer 212, due to exposure to the local oxygen partial pressure $LpO_2$. As shown in FIG. 3, in some embodiments of the present invention, an oxide layer is not formed between the first cladding layer 214 and the perovskite dielectric layer 100. Thus, the perovskite dielectric layer is directly on the first cladding layer 214 in some embodiments of the present invention. The high dielectric properties of the perovskite dielectric layer 100 may be preserved, for example, in capacitor applications. In some embodiments of the present invention, the oxide layer 310 may be between about 0.1 µm and about 1.0 µm thick. The oxide layer 310 may be removed during subsequent processing if desired.

Figure 4:
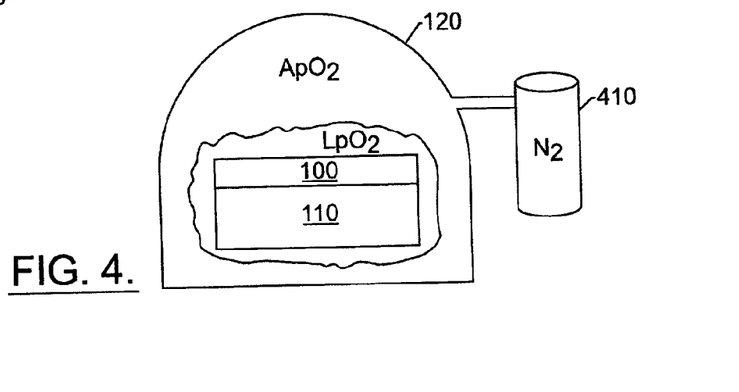

FIG. 4 illustrates other embodiments of the present invention wherein the ambient oxygen partial pressure $ApO_2$ may be obtained by using a conventional nitrogen ($N_2$) ambient that contains about five parts per million oxygen. More specifically, a conventional bottled nitrogen gas cylinder 410 may be used. As is well known, conventional nitrogen gas cylinders 410 are 99.999% pure and can have an oxygen partial pressure of between about $10^{-3}$ Torr and about $10^{-2}$ Torr, so that the ambient oxygen partial pressure $ApO_2$ can be between about $10^{-3}$ and about $10^{-2}$ Torr. Thus, in some embodiments of the invention, atmospheric pressure annealing using a conventional nitrogen gas cylinder may be used, while still allowing a desirably low local oxygen partial pressure $LpO_2$ adjacent the perovskite dielectric layer 100. In yet other embodiments, liquid nitrogen may be boiled off to obtain the ambient oxygen partial pressure $ApO_2$.

Figure 5:
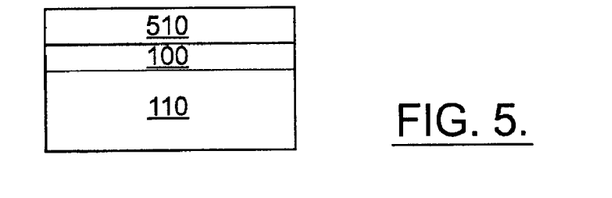
FIGS. 5 and 6 are cross-sectional views of electronic structures according to various embodiments of the present invention that may be formed according to various embodiments of the present invention.
Figure 6:
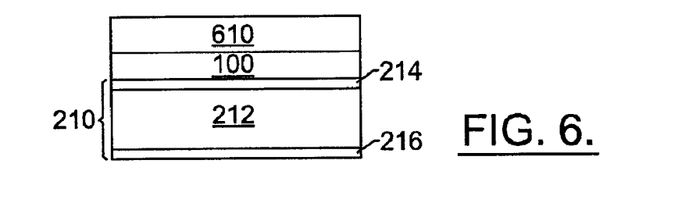

FIGS. 5 and 6 are cross-sectional views of capacitors that are fabricated according to some embodiments of the present invention. More specifically, referring to FIG. 5, a perovskite dielectric layer 100 and an oxygen-absorbing layer 110 that have been annealed according to embodiments of the present invention, for example as described in FIG. 1, may be further processed to form an electrode 510 thereon. Structures of FIG. 5 may provide a capacitor, wherein the oxygen-absorbing layer 110 and the electrode 510 provide the capacitor plates and the perovskite dielectric layer 100 provides the capacitor dielectric therebetween. It will be understood that the electrode 510 may be the same as or different from the oxygen-absorbing layer 110. In some embodiments of the present invention, the electrode 510 may comprise nickel, nickel alloy, copper, copper alloy, platinum and/or palladium. The electrode 510 may be formed on the perovskite dielectric layer 110 by evaporation, sputtering, plasma deposition, chemical vapor deposition, vacuum plating, electroplating, electroless plating and/or other conventional techniques. Other embodiments of capacitor electrodes are described in the above-cited copending application to the present inventors, and need not be described in detail herein.

FIG. 6 is a cross-sectional view of other capacitor structures that may be fabricated according to some embodiments of the present invention. In FIG. 6, an electrode 610 is formed on the perovskite dielectric layer 100 that includes a multilayer oxygen-absorbing layer 210 thereon, which was processed, for example, according to embodiments of the present invention that were described in connection with FIG. 2. The composition of the electrode 610 may be the same as or different from the electrode 510.

Figure 7A:
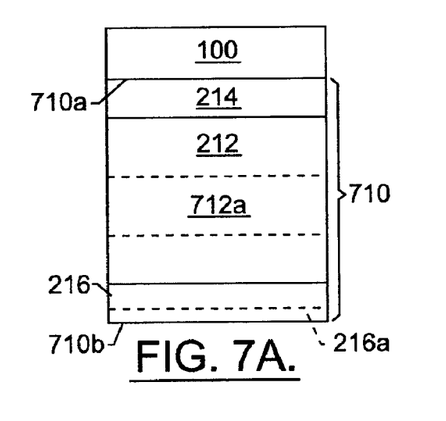
FIGS. 7A and 8A are cross-sectional views of other electronic structures that may be formed according to various embodiments of the present invention.
Figure 7B:
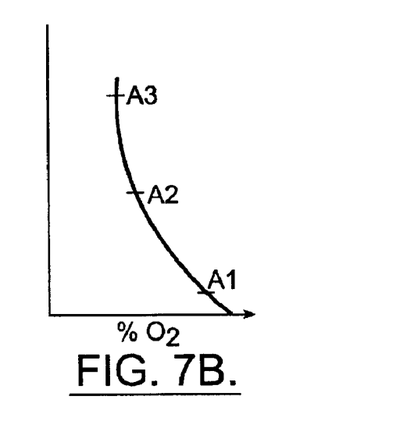
FIGS. 7B and 8B graphically illustrate oxygen concentration profiles in the structures of FIGS. 7A and 8A respectively, according to various embodiments of the present invention.
Figure 8A:
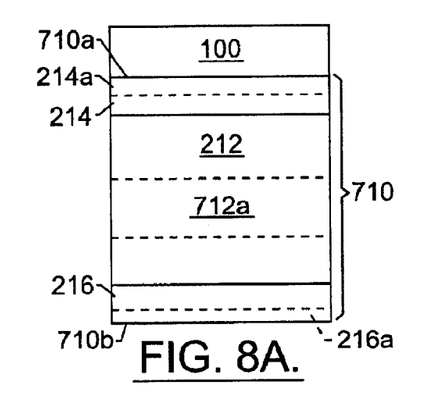
Figure 8B:
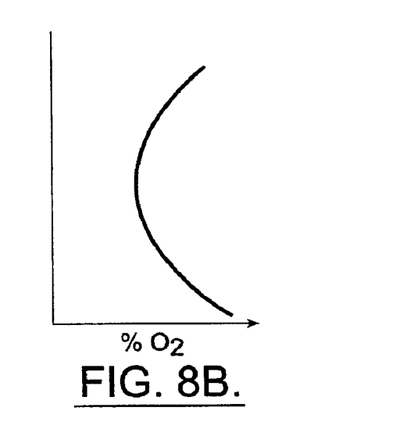

FIGS. 7A and 8A are cross-sectional views of electronic structures that may be formed according to various embodiments of the present invention. FIGS. 7B and 8B graphically illustrate oxygen concentration profiles (represented by a percentage oxygen as a function of location) in the structures of FIGS. 7A and 8A, respectively, according to various embodiments of the present invention. As shown in FIGS. 7A and 8A, electronic structures according to some embodiments of the present invention include a perovskite dielectric layer 100 and an oxygen-containing layer 710, having a first face 710a adjacent the perovskite dielectric layer 100, a second face 710b opposite the perovskite dielectric layer 100, and a center region 712a therebetween. In some embodiments of the present invention, the oxygen-containing layer 710 can include a core layer 212 and first and second cladding layers 214 and 216, respectively, as already described.

As shown in FIGS. 7B and 8B, in some embodiments of the present invention, the oxygen-containing layer 710 has a lower oxygen concentration at the center region 712a than adjacent at least one of the first and second faces 710a and 710b thereof. In FIG. 7B, the oxygen-containing layer 710 has a lower oxygen concentration at the center region 712a than adjacent the second face 710b thereof. In contrast, as shown in FIG. 8B, the oxygen concentration at the center region 712a is lower than adjacent both the first face 710a and the second face 710b of the oxygen-containing layer 710. Moreover, as shown in FIG. 7B, in some embodiments of the present invention, the oxygen concentration in the oxygen-containing layer 710 decreases from adjacent the second face 710b to adjacent the first face 710a. In some embodiments, these decreases may follow a functional form that is consistent with a diffusion controlled process, such as, but not limited to, exponential decay. Finally, as shown in FIG. 8B, in other embodiments of the present invention the oxygen concentration in the oxygen-containing layer 710 decreases from adjacent the second face 710b to the center region 712a and from adjacent the first face 710a to the center region 712a. In some embodiments, these decreases may follow a functional form that is consistent with a diffusion controlled process, such as, but not limited to, exponential decay.

It will be understood that the center region 712a need not be centered between the first face 710a and the second face 710b of the oxygen-containing layer 710, and need not be symmetrical. Rather, the center region 712a defines a buried region in the oxygen-containing layer 710 that is separated from the first face 710a and the second face 710b.

As shown in FIG. 7B, in some embodiments of the present invention, the core layer 212 includes an average oxygen concentration A2 that is less than the average oxygen concentration A1 of the second cladding layer 216. Moreover, the first cladding layer 214 includes an average oxygen concentration A3 that is less than the average oxygen concentration A2 of the core layer 212. According to other embodiments of the present invention, and as also shown in FIG. 7B, the average oxygen concentration decreases across the core layer 212 from adjacent the second cladding layer 216 to adjacent the first cladding layer 214. In some embodiments, these decreases may follow a functional form that is consistent with a diffusion controlled process, such as, but not limited to, exponential decay.

Without wishing to be bound by any theory of operation, oxygen concentration profiles as shown in FIG. 7B according to some embodiments of the invention may arise when there is more absorption of oxygen at the second face 710$b$ of the oxygen-containing layer 710 than at the first face 710$a$. This may arise when the perovskite dielectric layer 100 and/or layers formed thereon, is sufficiently thick to block at least some absorption of oxygen from the ambient, so that more oxygen is absorbed through the second face 710$b$ than from the first face 710$a$. This may occur, according to some embodiments of the present invention, when the perovskite dielectric layer 100 is more than about 1.0 $\mu$m thick.

FIG. 8B illustrates other embodiments of the present invention, wherein relatively high average oxygen concentrations are contained both in the first and the second cladding layers 214 and 216 relative to the core layer 212. Without wish to be bound by any theory of operation, these embodiments of the present invention may be produced when perovskite dielectric layer 100 is sufficiently thin, for example less than about 1.0 $\mu$m, so that relatively large amounts of oxygen diffuse therethrough into the core layer 212 through the first cladding layer 214. In these embodiments of the present invention, as shown in FIG. 8B, the average oxygen concentration of the core layer 212 is less than the average oxygen concentration in both the first cladding layer 214 and the second cladding layer 216. Stated differently, the oxygen concentration in the core layer 212 decreases from adjacent either surface of the core layer 212 towards the center region 712$a$. In other embodiments of the present invention, the oxygen concentration decreases from adjacent the first cladding layer 214 to the center region 712$a$, and also decreases from adjacent the second cladding layer 216 to the center region 712$a$. In some embodiments, these decreases may follow a functional form that is consistent with a diffusion controlled process, such as, but not limited to, exponential decay. It will be understood that the oxygen concentration profile of FIG. 7B need not be symmetric in some embodiments of the present invention. In other embodiments of the present invention, a symmetric oxygen concentration profile may be present.

In some embodiments of the present invention, the cladding layers 214 and 216 do not oxidize sufficiently to form an oxidized surface. In other embodiments of the present invention, an oxidized surface 216$a$ may be formed in the second cladding layer 216, as shown in FIG. 7A, but the first cladding layer 214 may be free of an oxidized surface therein. In still other embodiments of the present invention, as shown in FIG. 8A, an oxidized surface 216$a$ may be formed in the second cladding layer 216 and an oxidized surface 214$a$ also may be formed in the first cladding layer 214$a$. According to still other embodiments of the present invention, the oxidized surface 214$a$ and/or 216$a$ can remain sufficiently conductive and thin, such that the oxygen-containing layer 710 can be used as an electrode, such as a bottom electrode for capacitors.

Additional qualitative discussion of some embodiments of the present invention now will be provided. Some embodiments of the present invention can provide oxygen-absorbing layers that can be used in combination with perovskite dielectric layers, to provide, during high temperature annealing, a low oxygen pressure environment local to the perovskite dielectric layer in a global environment where oxygen pressure is considerably higher. This low oxygen pressure local environment can enhance the dielectric properties, for example in capacitor applications where loss tangent values may be reduced or minimized.

Oxygen-absorbing layers according to some embodiments of the present invention also may be regarded as gettering substrates. In the absence of such a gettering substrate, complicated mechanisms may be needed to achieve the appropriate atmospheric control. These complicated mechanisms may include annealing furnaces equipped for high vacuum processing and/or for controlled gas mixture, such as $CO/CO_2$. In some embodiments of the present invention, the gettering substrate includes a multilayer foil which can consume oxygen from the environment local to the perovskite dielectric overlayer without self-passivation, i.e., without forming a thin oxide skin which prevents additional oxygen from diffusing into the multilayer foil. In addition, in other embodiments of the present invention, the metal in contact with the perovskite dielectric layer may not react to form additional crystalline or amorphous products.

In some embodiments of the present invention, the multilayer foil comprises a copper core sandwiched between two electroless nickel cladding layers. In other embodiments, only a single cladding layer may be provided. Both copper and nickel have the capability to oxidize passively, so that the foil can oxidize incompletely and allow additional oxygen to pass through any oxidized surface. Moreover, any oxidized surface can remain sufficiently conductive and thin, for example less than about 1.0 $\mu$m thick, such that the foil can still be used as the bottom electrode for capacitors defined from the perovskite dielectric thin film. Electroless nickel is stable in contact with many oxides at the firing temperatures of interest.

The perovskite dielectric layer may be of a composition that is tolerant of a high temperature environment with a low oxygen partial pressure. In some embodiments of the present invention, the perovskite dielectric layer is an acceptor-doped insulating perovskite. In other embodiments of the present invention, the perovskite dielectric layer is calcium-doped lead zirconate titantate, with a general chemical formula $Pb_{1-x}Ca_{x+y}(Zr_ATi_B)_{1-y}O_3$ where $(x+y) \leq 15$ and $(a+b)=1$. When this type of doping is combined with a low oxygen pressure anneal, a low loss dielectric deposited on a low cost base metal foil substrate may be provided, according to some embodiments of the present invention.

In general, it may be highly desirable to use base metals for the conducting layers of electrical devices, such as capacitors, inductors and/or transistors that are based upon perovskite dielectrics, for example due to the generally lower cost of base metals in comparison with noble metals, such as platinum. Unfortunately, base metals may be difficult to incorporate, since they tend to react or oxidize when in contact with commonly used perovskite dielectrics during elevated temperature anneals that are generally used for processing and/or integration.

Base metals, such as nickel and copper, can be used with perovskite dielectrics, and cofired to high temperatures if the atmospheric conditions are well controlled. Specifically, if the oxygen pressure is reduced to a sufficiently low value, the base metal can survive a high temperature anneal without oxidation, so that it does not become insulating. However, many times this pressure may be sufficiently low, so as to degrade the perovskite dielectric itself.

It is known, however, that the perovskite dielectric can itself be modified compositionally to survive this low oxygen pressure treatment. This process is commonly referred to in the capacitor industry as acceptor doping. For example, it is known to provide manganese doping of BTO. Then, a vacuum anneal can produce an oxygen-deficient insulator, in which the insulating properties may be compromised, but with the appropriate acceptor doping, the low loss insulating properties of interest can be preserved. Thus, processing compatibility between the dissimilar materials can be achieved. Another well known example of acceptor doping is calcium-doped lead zirconate titanate. It is known that, under appropriate processing conditions and stoichiometry, calcium can substitute for titanium or zirconium. Thus, the calcium can act as an acceptor dopant, and can provide the desired defect chemistry effects.

Low oxygen pressures are conventionally achieved by vacuum annealing and/or by atmospheric pressure annealing in a gas mixture having an effectively low oxygen partial pressure, such as mixtures between CO and $CO_2$ and or mixtures between $H_2$ and $H_2O$. In either case, significant effort and/or expense may be needed to develop and maintain such capability, because oxygen partial pressures in the range of $10^{-10}$ Torr may be desirable.

In sharp contrast, according to some embodiments of the present invention, the potential benefits of base metals and perovskite dielectrics may be achieved through the use of a potentially simpler annealing equipment. According to some embodiments of the present invention, by having the perovskite dielectric in contact with a base metal foil, and having the foil be much more massive than the perovskite dielectric, the interaction of the foil with the furnace atmosphere can set the oxygen partial pressure in the foil's immediate vicinity through slow oxygen gettering. The perovskite dielectric layer, for example not more than 1 $\mu$m in thickness, then resides in this pressure-reduced region. Thus, in some embodiments of the present invention, an atmosphere's oxygen partial pressure may only need to be reduced to a medium level consistent with that of commonly available bottled inert gases. For example, a gas cylinder of $N_2$ with an impurity of 99.999% will have an oxygen partial pressure of between about $10^{-3}$ Torr and about $10^{-2}$ Torr. This level of oxygen has been experimentally determined to be sufficiently low, so as not to over-oxidize the composite metal substrates. Moreover, this type of atmosphere may be achieved inexpensively.

It will be understood that much of the above description has related to thin film capacitor applications. However, oxygen-absorbing layers according to embodiments of the present invention may be used with other applications of a perovskite dielectric layer where the perovskite dielectric layer is annealed at elevated temperature in an environment where low oxygen partial pressure is desired. Moreover, oxygen-absorbing layers according to some embodiments of the present invention may be used with layers that do not comprise perovskite dielectric, where the layers are annealed at elevated temperatures in an environment where low oxygen partial pressure is desired.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling oxygen partial pressure during annealing of a perovskite dielectric layer comprising:
    providing an oxygen-absorbing layer adjacent the perovskite dielectric layer; and
    annealing the perovskite dielectric layer in an ambient that includes an ambient oxygen partial pressure such that the oxygen-absorbing layer is exposed to the ambient and locally reduces the oxygen partial pressure adjacent the perovskite dielectric layer to below the ambient oxygen partial pressure.

2. A method according to claim 1 wherein the oxygen-absorbing layer comprises at least one base metal.

3. A method according to claim 1 wherein the perovskite dielectric layer comprises acceptor-doped lead zirconate titanate.

4. A method according to claim 1 wherein the annealing comprises annealing the perovskite dielectric layer in an ambient that includes an ambient oxygen partial pressure of at least about $10^{-5}$ Torr at temperature of at least about 500° C.

5. A method according to claim 1 wherein the annealing comprises annealing the perovskite dielectric layer in an ambient that includes an ambient oxygen partial pressure of at least about $10^{-3}$ Torr at temperature of at least about 500° C.

6. A method according to claim 1 wherein the annealing comprises annealing the perovskite dielectric layer in an ambient that includes an ambient oxygen partial pressure of between about $10^{-3}$ Torr and about $10^{-2}$ Torr at temperature of about 750° C.

7. A method according to claim 1 wherein the annealing comprises annealing the perovskite dielectric layer at atmospheric pressure in a nitrogen ambient that contains about 5 parts per million of oxygen.

8. A method according to claim 1 wherein the annealing comprises annealing the perovskite dielectric layer at atmospheric pressure in a nitrogen ambient that is obtained from a bottled nitrogen gas cylinder.

9. A method according to claim 1 wherein the annealing is followed by forming an electrode on the perovskite dielectric layer opposite the oxygen-absorbing layer to produce a capacitor.

10. A method according to claim 1 wherein the annealing comprises annealing the perovskite dielectric layer in ambient that includes an ambient oxygen partial pressure such that the oxygen-absorbing layer is exposed to the ambient and locally reduces the oxygen partial pressure adjacent the perovskite dielectric layer to below the ambient oxygen partial pressure and does not form an oxide of the oxygen-absorbing layer between the oxygen-absorbing layer and the perovskite dielectric layer.

11. A method of fabricating an electronic structure comprising:
    forming an acceptor-doped perovskite dielectric layer on a conductive layer that comprises a base metal; and
    annealing the acceptor-doped perovskite layer in an ambient that includes an ambient oxygen partial pressure such that the conductive layer that comprises a base metal is exposed to the ambient and absorbs oxygen adjacent the acceptor-doped perovskite dielectric layer to locally reduce the oxygen partial pressure in the acceptor-doped perovskite dielectric layer below the ambient oxygen partial pressure.

12. A method according to claim 11 wherein the acceptor-doped perovskite dielectric layer comprises calcium doped lead zirconate titanate.

13. A method according to claim 11 wherein the annealing comprises annealing the acceptor-doped perovskite dielectric layer in an ambient that includes an ambient oxygen partial pressure of at least about $10^{-5}$ Torr at temperature of at least about 500° C.

14. A method according to claim 11 wherein the annealing comprises annealing the acceptor-doped perovskite dielectric layer in an ambient that includes an ambient oxygen partial pressure of at least about 10–3 Torr at temperature of at least about 500° C.

15. A method according to claim 11 wherein the annealing comprises annealing the acceptor-doped perovskite dielectric layer in an ambient that includes an ambient oxygen partial pressure of between about $10^-$Torr and about $10^{-2}$ Torr at temperature of about 750° C.

16. A method according to claim 11 wherein the annealing comprises annealing the acceptor-doped perovskite dielectric layer at atmospheric pressure in a nitrogen ambient that contains about 5 parts per million of oxygen.

17. A method according to claim 11 wherein the annealing comprises annealing the acceptor-doped perovskite dielectric layer at atmospheric pressure in a nitrogen ambient that is obtained from a bottled nitrogen gas cylinder.

18. A method according to claim 11 wherein the annealing is followed by forming an electrode on the acceptor-doped perovskite dielectric layer opposite the conductive layer that comprises a base metal to produce a capacitor.

19. A method according to claim 11 wherein the conductive layer that comprises a base metal comprises a core layer comprising a base metal having opposing faces and a cladding layer comprising a base metal on one of the opposing faces, and wherein the forming comprises forming the acceptor-doped perovskite dielectric layer on the cladding layer.

20. A method according to claim 11 wherein the annealing comprises annealing the acceptor-doped perovskite layer in an ambient that includes an ambient oxygen partial pressure such that the conductive layer that comprises a base metal absorbs oxygen adjacent the acceptor-doped perovskite dielectric layer to locally reduce the oxygen partial pressure in the acceptor-doped perovskite dielectric layer below the ambient oxygen partial pressure and does not form an oxide of the base metal between the conductive layer and the perovskite dielectric layer.

21. A method of fabricating an electronic structure comprising:
providing a metal foil comprising a cladding layer comprising a base metal and a core layer comprising a base metal thereon;
forming a perovskite dielectric layer on the cladding layer; and
annealing the perovskite dielectric layer in an ambient that includes an ambient oxygen partial pressure of at least about $10^{-5}$ Torr at temperature of at least about 500° C. such that the metal foil is exposed to the ambient and locally reduces the oxygen partial pressure adjacent the perovskite dielectric layer to below the ambient oxygen partial pressure.

22. A method according to claim 21 wherein the annealing comprises annealing the perovskite dielectric layer in an ambient that includes an ambient oxygen partial pressure of at least about $10^{-3}$ Torr at temperature of at least about 500° C.

23. A method according to claim 21 wherein the annealing comprises annealing the perovskite dielectric layer in an ambient that includes an ambient oxygen partial pressure of between about $10^{-3}$ Torr and about $10^{-2}$ Torr at temperature of at least about 500° C.

24. A method according to claim 21 wherein the annealing comprises annealing the perovskite dielectric layer in an ambient that includes an ambient oxygen partial pressure of between about $10^{-3}$ Torr and about $10^{-2}$ Torr at temperature of about 750° C.

25. A method according to claim 21 wherein the annealing comprises annealing the perovskite dielectric layer at atmospheric pressure in a nitrogen ambient that contains about 5 parts per million of oxygen.

26. A method according to claim 21 wherein the annealing comprises annealing the perovskite dielectric layer at atmospheric pressure in a nitrogen ambient that is obtained from a bottled nitrogen gas cylinder.

27. A method according to claim 21 wherein the forming a perovskite dielectric layer on the first cladding layer comprises forming a perovskite dielectric layer directly on the cladding layer.

28. A method according to claim 21 wherein the annealing is followed by forming an electrode on the perovskite dielectric layer opposite the metal foil to produce a capacitor.

29. A method according to claim 21 wherein the perovskite dielectric layer comprises calcium doped lead zirconate titanate, wherein the core layer comprises copper and wherein the cladding layer comprises nickel.

30. A method according to claim 21 wherein the annealing comprises annealing the perovskite dielectric layer in an ambient that includes an ambient oxygen partial pressure of at least about $10^{-5}$ Torr at temperature of at least about 500° C. without forming an oxide of the first cladding layer between the cladding layer and the perovskite dielectric layer.

* * * * *

UNITED STATES PATENT AND TRADEMARK OFFICE
CERTIFICATE OF CORRECTION

PATENT NO.   : 6,936,301 B2
DATED        : August 30, 2005
INVENTOR(S)  : Maria et al.

It is certified that error appears in the above-identified patent and that said Letters Patent is hereby corrected as shown below:

Column 13,
Line 17, should read -- partial pressure of between about $10^{-3}$ Torr and about $10^{-2}$ --.

Signed and Sealed this

Tenth Day of January, 2006

JON W. DUDAS
*Director of the United States Patent and Trademark Office*